United States Patent [19]

Ito et al.

[11] Patent Number: 5,598,624

[45] Date of Patent: Feb. 4, 1997

[54] METHOD OF CONNECTING AN ELECTRIC CONNECTOR WITH FALSE CONNECTION PREVENTING MECHANISM

[75] Inventors: Keiichi Ito; Hirotaka Noda; Masao Shibata; Kenichi Yamauchi, all of Aichi; Masaru Fukuda, Shizuoka; Motoyoshi Suzuki, Shizuoka; Yukio Ohta, Shizuoka, all of Japan

[73] Assignee: Yazaki Corporation, Tokyo, Japan

[21] Appl. No.: 393,830

[22] Filed: Feb. 24, 1995

Related U.S. Application Data

[62] Division of Ser. No. 143,905, Nov. 2, 1993, Pat. No. 5,527,186.

[30] Foreign Application Priority Data

Nov. 5, 1992 [JP] Japan ...................... 4-295774

[51] Int. Cl.⁶ ............................ H01R 43/20; H01R 43/04
[52] U.S. Cl. ...................... 29/593; 29/876; 29/881
[58] Field of Search ........................ 29/593, 857, 874, 29/876, 881

[56] References Cited

U.S. PATENT DOCUMENTS 4,941,839  7/1990  Nagasaka et al. ............... 439/352
5,030,127  7/1991  Blasko et al. .
5,096,436  3/1992  Noschese ......................... 29/876
5,100,339  3/1992  Sato et al. .

*Primary Examiner*—P. W. Echols
*Attorney, Agent, or Firm*—Armstrong, Westerman, Hattori, McLeland & Naughton

[57] ABSTRACT

A pair of connector elements, one connector element having a locking arm, the other connector element having a hood for receiving the one connector element and a locking protrusion provided within the hood are locked in engagement by the locking arm and the locking protrusion when they are completely coupled with each other. When the connector elements are not used or before they are coupled with each other, a body for preventing the one connector element from being fit into the other connector element is inserted in the hood of the other connector element. The body has a locking arm to be engaged with the locking protrusion and a locking portion into which a dedicated jig for pulling out the body from the hood is to be inserted. Thus, in electric wiring (e.g., an air bag for motor vehicles), a connection of the connector elements is prevented with a false current is flowing through one of the connector elements, thus preventing error (e.g., an explosion in an inflator).

7 Claims, 8 Drawing Sheets

METHOD OF CONNECTING AN ELECTRIC CONNECTOR WITH FALSE CONNECTION PREVENTING MECHANISM

This is a division of application Ser. No. 08/143,905 filed Nov. 2, 1993 now U.S. Pat. No. 5,527,186.

BACKGROUND OF THE INVENTION

1. Field of the Invention

The present invention relates to an electric connector and more particularly to an electric connector with an erroneous connection preventing mechanism and a method of connecting thereof. The electric connector and method are preferably adopted in electric wiring for an air bag system for a motor vehicle.

2. Description of the Prior Art

The following problem has existed in a conventional air bag system provided at a driver's seat for a motor vehicle. If a false current flows through a computer at the time of connecting an inflator to the computer, the inflator may explode and an assembler may be injured.

In order to overcome such difficulty, in the conventional line of assembling motor cars, the following contrivance is adopted. As shown in FIG. 11, in connecting a connector b from a computer, computer a, provided conventional in an instrument panel; with a connector d for a steering pad c incorporated in an inflator, the connector b is tested by a conduction checker, and if it is not confirmed that no erroneous current flows through the connector b, the steering pad c cannot be taken out from a predetermined closet.

On the other hand, in order to improve the safety of motor cars, an air bag for a passenger's seat and pre-loader system will be necessary in the future. But, when these systems are employed, attachments are not as small as the steering pad so that the conventional method described above cannot be used. For this reason, it is difficult to assure the safety in working on an assembling line.

SUMMARY OF THE INVENTION

The present invention has been accomplished to solve the above problem.

One object of the present invention is to provide an electric connector having a mechanism which prevents false connection of a pair of connector elements in wiring a safety guard device such as an air bag.

Another object of the present invention is to provide a method of connecting a pair of connector elements by using a false connection preventing mechanism.

In accordance with one aspect of the present invention, there is provided an electric connector comprising a pair of connector elements to be coupled with each other, one connector element having a locking arm, the other connector element having a hood for receiving the one connector element and a locking protrusion provided within the hood, the pair of connector elements being locked in engagement by the locking arm and the locking protrusion when they are completely coupled with each other, and a mechanism for preventing the one connector part from being fit into the other connector element, the mechanism being inserted in the hood before the connector elements are coupled with each other and taken out therefrom later.

In accordance with another aspect of the present invention, there is provided a method of connecting a pair of connector elements to be coupled with each other, one connector element having a locking arm, the other connector element having a hood for receiving the one connector element and a locking projection provided within the hood, comprising the steps of inserting, into the hood, means for preventing the one connector element from being fit into the hood of the other connector element, examining whether or not a false current is flowing through the other connector element, if it is confirmed that the erroneous current is not flowing therethrough, pulling out the mechanism from the hood, and fitting the one connector element in the other connector element and locking them to each other whereby the pair of connector elements are locked in engagement by the locking arm and the locking protrusion when they are completely coupled with each other.

In accordance with the present invention, in fitting the one connector element into the hood of the other connector element, unless a fit-preventing mechanism or body is pulled out from the hood, the one connector element cannot be fit in the other connector element. The fit-preventing body can be equipped with an insertion-lock portion so that it can be pulled out from the hood only when a dedicated pulling-out jig is used in such a manner that it is inserted in the insertion lock portion.

In the present invention, in connecting a pair of connector elements, when it is confirmed that no false current flows through the one connector element, the pair of connector elements can be coupled and connected with each other. In this case, the dedicated pulling-out jig can be operated so that only when the above fact is confirmed, the dedicated pulling-out jig can be taken out from a predetermined position. Thus, it is possible to avoid erroneously connecting the connector part on the computer side with a false current flowing therethrough with the connector element on the inflator side, thus assuring the safety of assembling work.

If the connecting process is organized so that advancement to the subsequent step only occurs when the jig used to pull out the fit-preventing body is returned to the predetermined position, a false connection generated when a previously used pulling-out jig is used for another electric connector can be prevented.

The above and other objects and features of the present invention will be more apparent from the following description taken in conjunction with the accompanying drawings.

DESCRIPTION OF THE PREFERRED EMBODIMENTS

Figure 1:
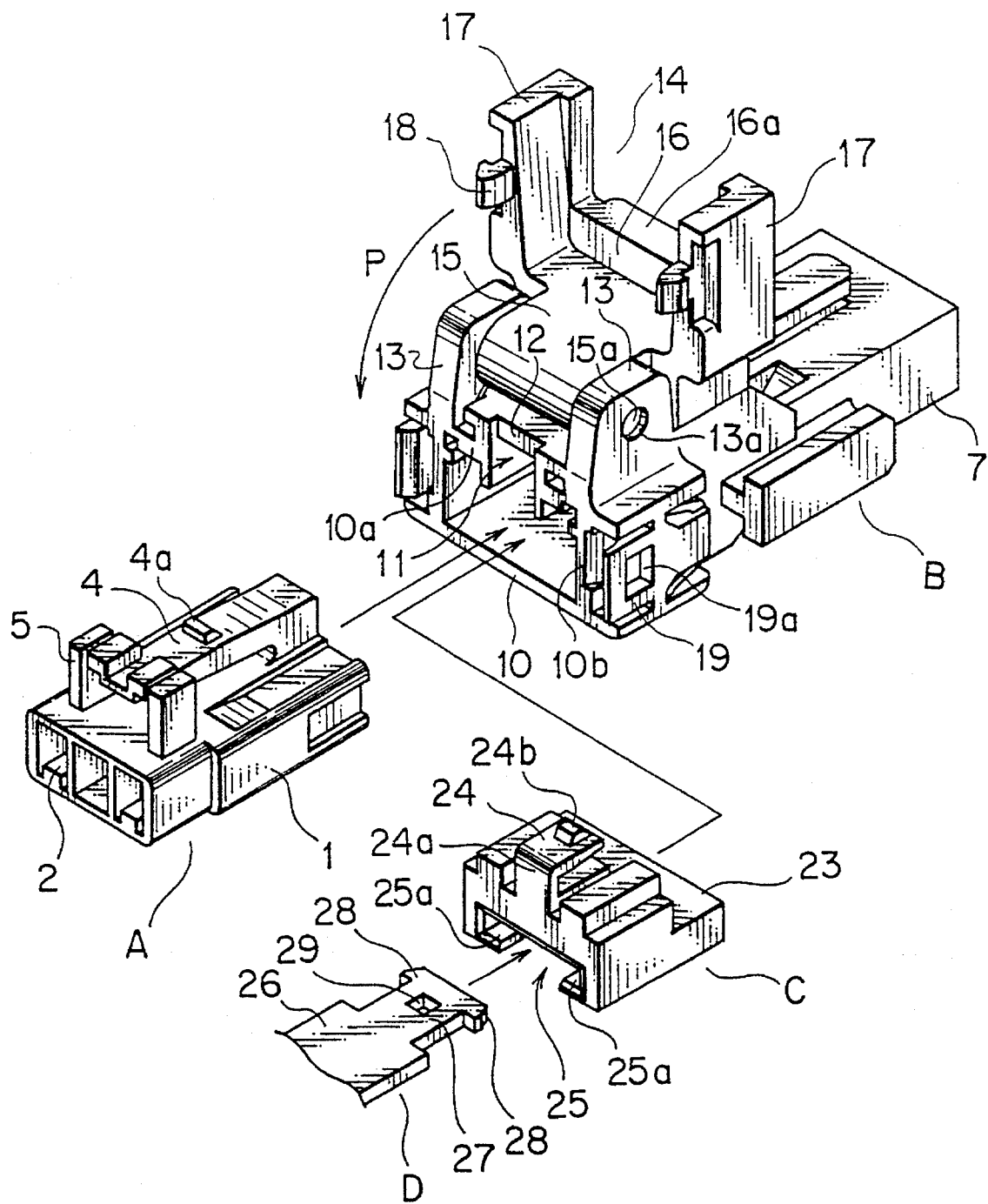
FIG. 1 is a perspective view of an electric connector equipped with a false connection preventing mechanism according to one embodiment of the present invention in its separation state.
Figure 3A:
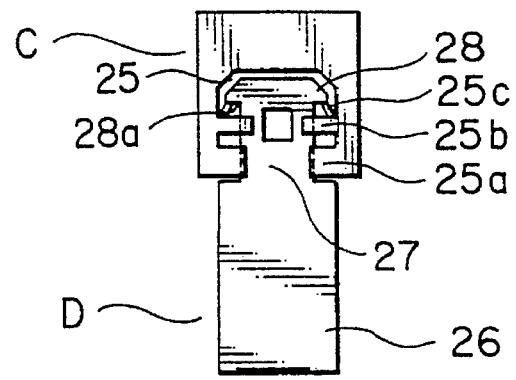
FIG. 3A and 3B are views for explaining the locking state of the fit-preventing body and the pulling-out jig and the method of unlocking the locked state, respectively.
Figure 3B:
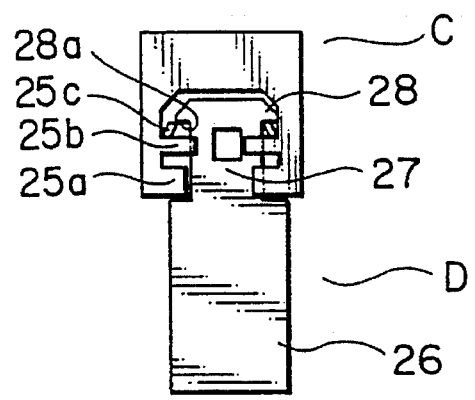
Figure 4:
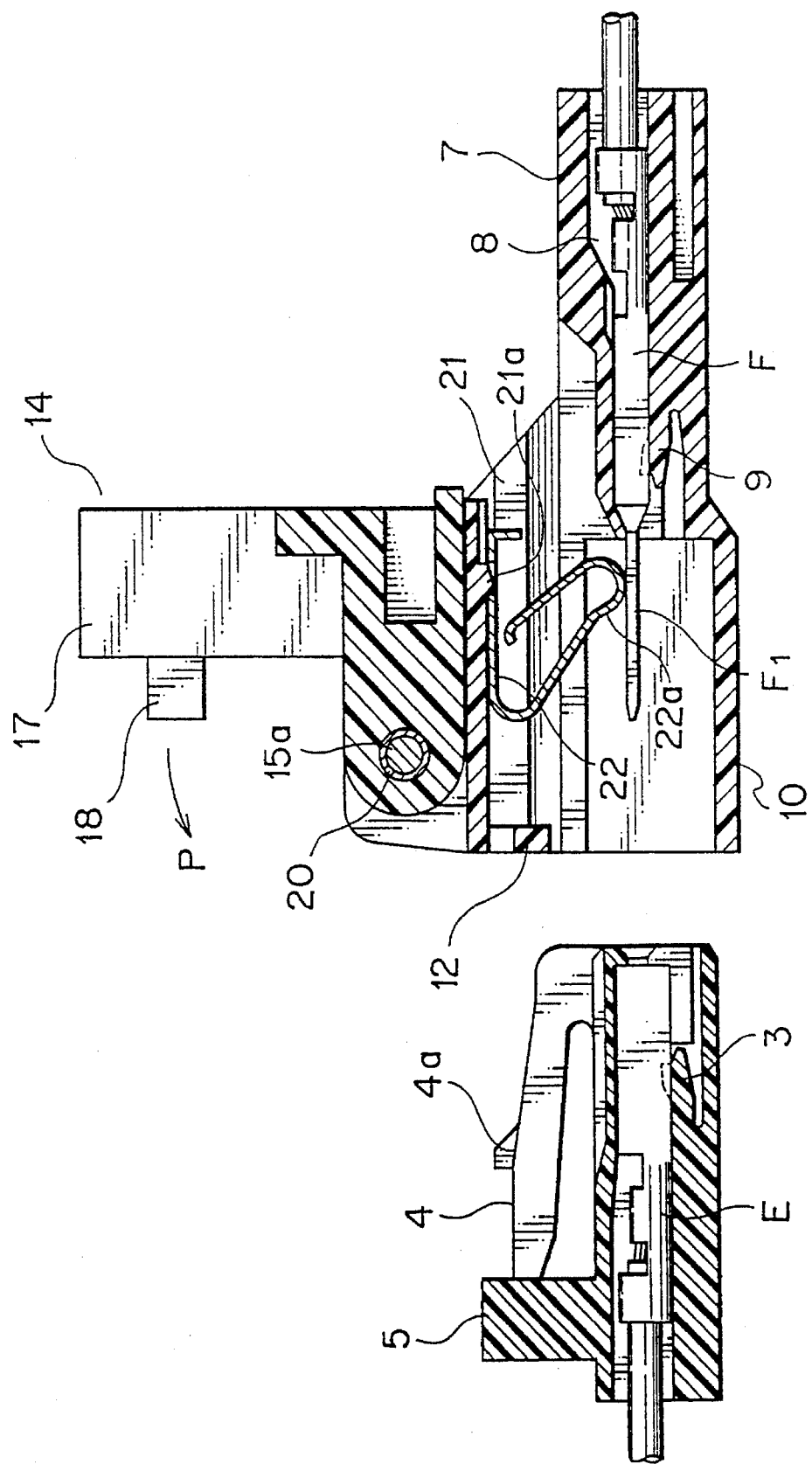
FIG. 4 is a longitudinal sectional view of a male connector A and a female connector B in their separation state.
Figure 5:
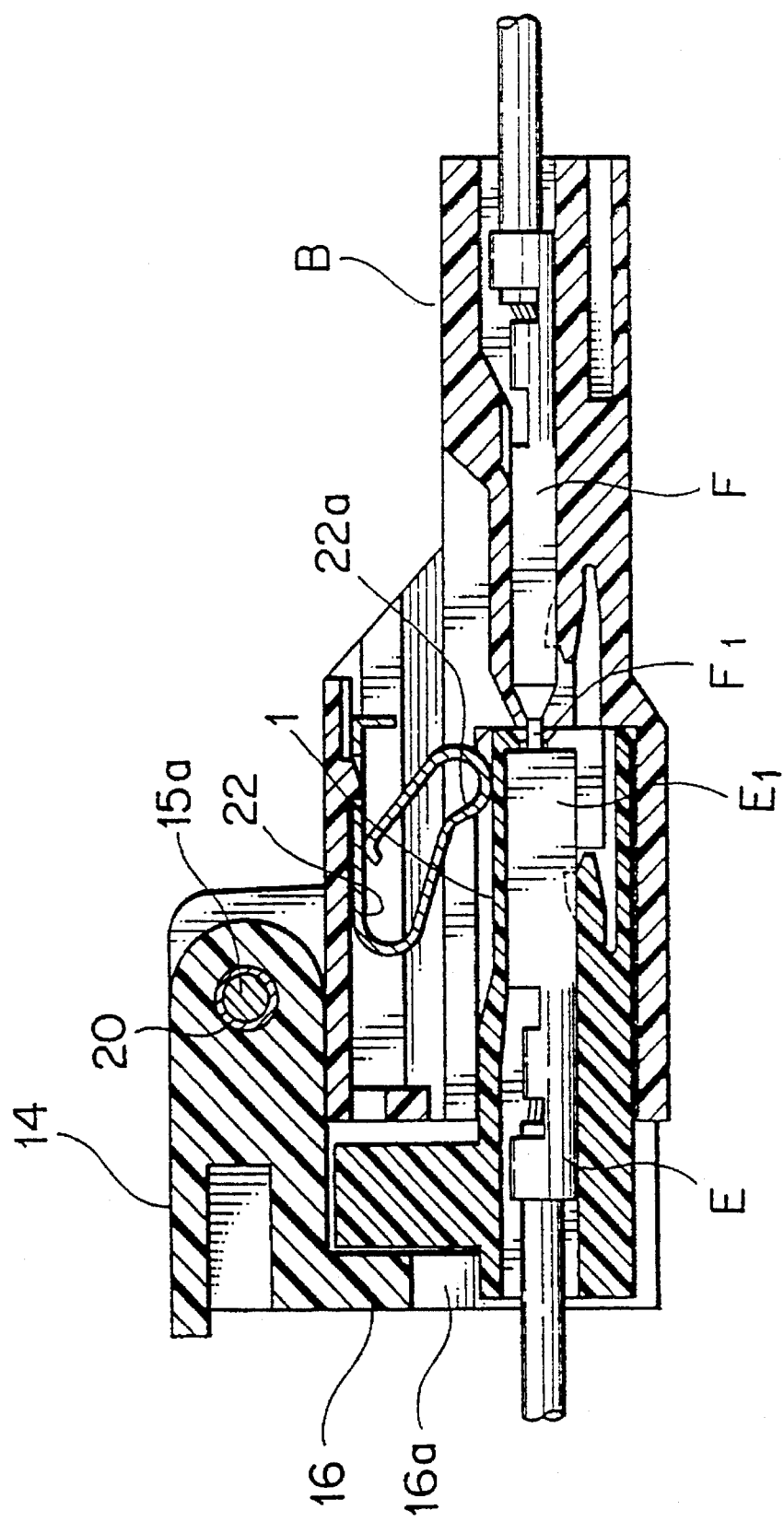
FIG. 5 is a longitudinal sectional view of the male connector A and the female connector B in their fitting and locking state.

In FIGS. 1 to 5, element A denotes a male connector; element B denotes a female connector provided with a hood 10 for receiving the male connector A; element C denotes a fit-preventing body which is also inserted in the hood 10; and element D denotes a dedicated jig for pulling out the fit-preventing body. The male and female connectors A and B incorporate a female terminal E and a male terminal F. The male connector A and the female connector B are electrically connected in such a manner that both connectors are fit so that a tube-like electric contact portion E1 is brought into contact with a tab-like male portion F1 (FIG. 5). A male-shape insulating housing 1 constituting the male connector A has, in its inside, two terminal housing chambers 2 in which the female terminal E is locked by a flexible locking arm 3, and has, in its outside, a cantilever locking arm 4 with a protrusion 4a (FIGS. 1 and 4). Numeral 5 denotes an arm guard for preventing the locking arm from suddenly bending owing to external force and from being damaged owing to its being hooked with an electric wire.

The female-shape insulating housing 7 constituting the female connector B has, in its inside, a terminal housing chamber 8 in which the male terminal F is locked by a flexible locking arm 9 as in the male connector A (FIG. 4). At the front portion of the insulating housing 7, the above hood for receiving the male connector A is formed protrusively (FIGS. 1 and 4). At the center of an upper wall 10a of the hood 10, a locking chamber 11 is formed sectionally. The locking chamber 11 is, in its interior, provided with a protrusion 12 to be engaged with the protrusion 4a of the locking arm 4 in the male connector A.

The female connector B has a locking member 14 which can detect an unfitting or incomplete fitting state for the male connector A. The locking member 14 is provided so as to be able to rotate to ear pieces 13, 13 vertically formed on both sides of the upper part of the hood 10 (FIGS. 1 and 4). Specifically, the locking member 14 includes a cover plate 16 which covers the back side of the male connector A when both connectors are completely coupled with each other, a plate 15 which supports the cover plate 16 and side plates 17, 17 on both sides of the cover plate 16. The supporting plate 15 has, at its base portion, an axial hole (not shown) through which a pin shaft 15a penetrates, and both ends of the pin shaft are placed on bearings 13a, 13a of the ear pieces 13, 13. The pin shaft 15a is wound by a coil spring 20 (FIG. 4) the one end of which is engaged with the supporting plate 15 and the other end of which is engaged with the upper wall of the hood 10. Thus, the cover plate 16 stands up straight on the hood 10 in the normal state (FIG. 5).

The cover plate 16 of the locking member 14 is provided with a recess 16a so that it is partially opened. The side plate on both of their sides are provided with protrusive locking picks 18 which are locked with locking holes 19a of a flexible locking piece provided on both exterior side walls of the hood 10.

Within the hood 10, a contact housing chamber 21 is formed behind the above locking chamber 11 (FIG. 4), and a contact 22 is locked by a protrusion 21a on the inner wall of the chamber 21. The contact 22 has a pair of resilient contact pieces 22a formed to be folded in a fork. When the male connector A is not fit into the hood 10, each of the resilient contact pieces 22 contacts with the terminals F1 of the adjacent male terminals F, F to short-circuit the circuit, thus preventing troubles such as false explosion in the inflator described above and false operation of the devices.

When the male connector A is inserted in the hood 10, part of the insulating housing 1 advances between the resilient contact piece 22a and male terminal F1 to separate them from each other. Thus, the coupling of the male and female connectors A and B cancels the short-circuiting of the circuit due to the contact 22.

Figure 2:
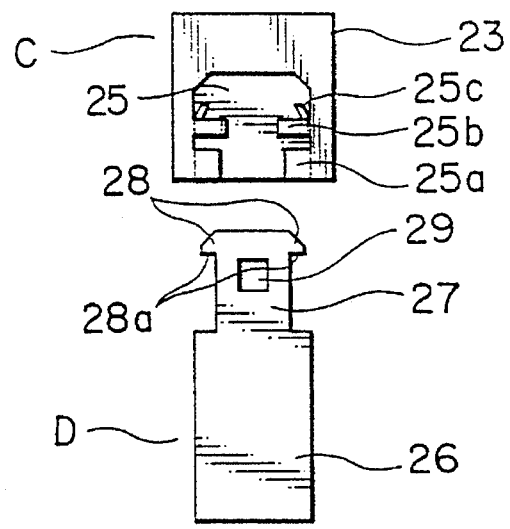
FIG. 2 is a bottom view of a fit-preventing body C and a pulling-out jig D for pulling it out in FIG. 1.

The fit-preventing body C is composed of a body 23 having a shape which substantially closes the hood 10. On the upper surface of the body 23, a locking arm 24 is provided, and on the lower surface of the body 23, an insertion-locking portion 25 for the pulling-out jig D is provided. The locking arm 24 extends forward through a rear rising base 24a and has a locking protrusion 24b at its free end. The protrusion 24b is tapered on its front and rear sides. On the other hand, insertion-locking portion 25 is a groove recessed on the bottom surface of the body 23. As shown in FIG. 2, on both sides of the groove wall, a pair of holding pieces 25a, 25a are provided oppositely in the inlet portion, a pair of supporting pieces 25b, 25b are provided oppositely in the intermediate portion and a pair of slip-off inhibiting pieces 25c, 25c are provided oppositely in the inner portion.

As seen from FIG. 1, the pulling-out jig D includes a plate body 26 at the one end of which a head 28 having locking pieces 28a, 28a on its both sides is formed through a narrow neck 27. The relative dimensions of the neck 27 and head 28 are defined as follows. As shown in FIG. 3A, when the pulling-out jig is inserted in the center of the insertion-locking portion 25, the neck 27 is supported by the flexible supporting pieces 25b, 25b and the locking pieces 28a, 28a are engaged with the slip-off inhibiting pieces 25c, 25c. As a result, the pulling-out jig is not slipped or pulled out from the insertion-locking portion 25. Further, as shown in FIG. 3B, when the pulling-out jig is shifted to one side of the insertion-locking portion 25, the neck 27 does not substantially overlap the supporting piece 25c on the other side. So if the corresponding other side of the pulling-out jig is tilted outwardly of the insertion locking portion, it can be easily taken out. Further, it should be noted that the pulling-out jig D is, at its neck 27, provided with a locking pin through-hole 29 which is used to store and lock the jig in a locker G described later.

Figure 6A:
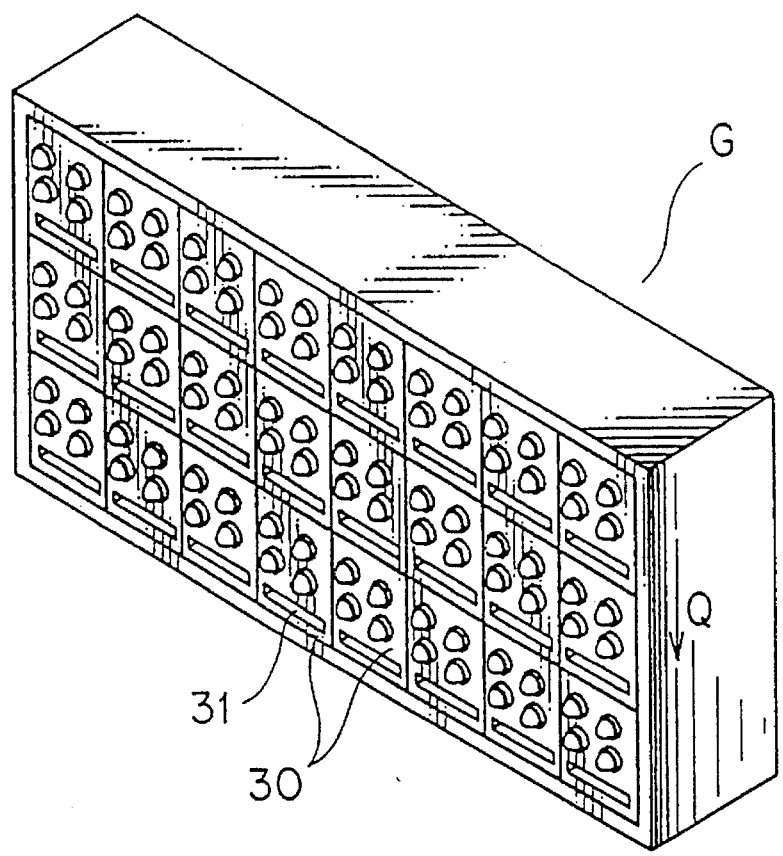
FIG. 6A is a perspective view showing one example of a locker G for storing pulling-out jigs D.
Figure 6B:
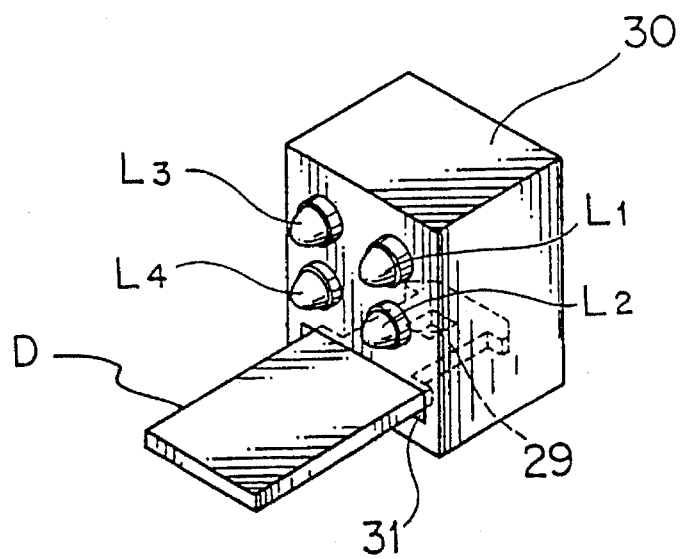
FIG. 6B is an enlarged perspective view of each of boxes 30 constituting the locker.
Figure 7:
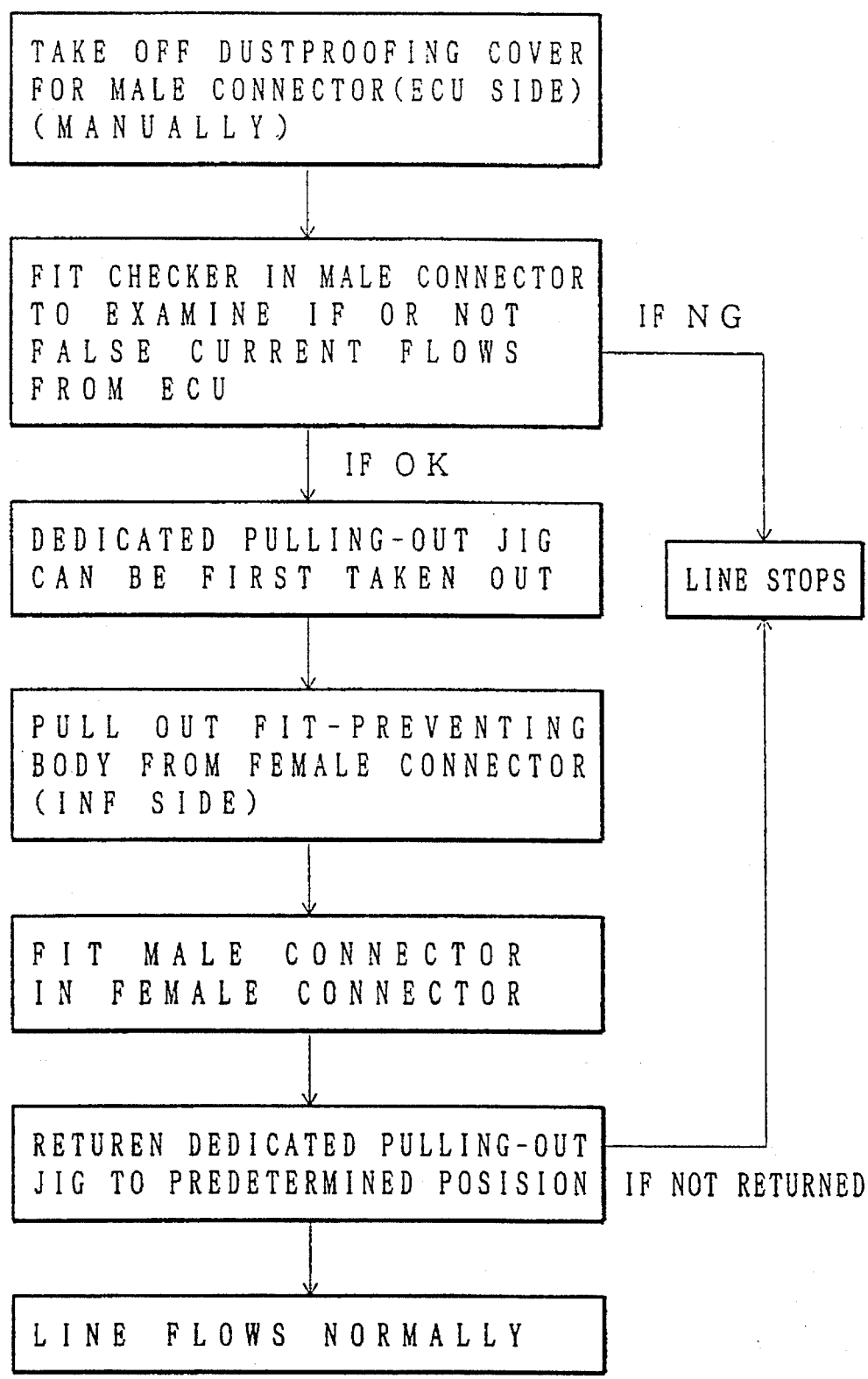
FIG. 7 is a flowchart showing the process of fit-connecting of the male connector A with the female connector.
Figure 8:
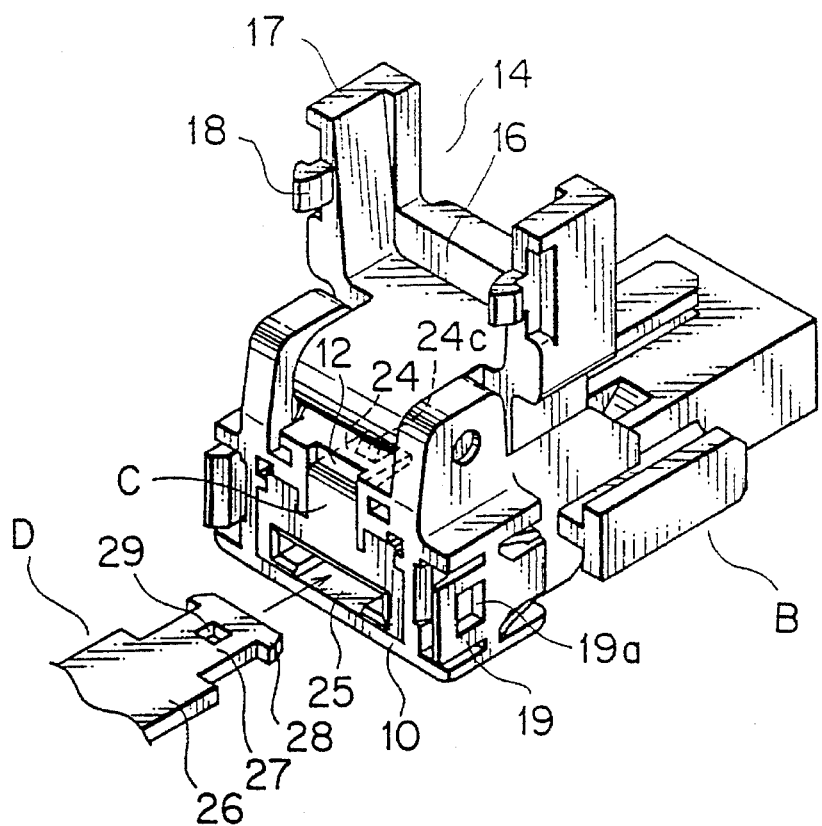
FIG. 8 is a view for explaining the method for pulling out the fit-preventing body from the female connector B.

FIG. 6A shows a locker G for storing pulling-out jigs D. The locker G has a plurality of boxes 30 arranged in plural stages. Each of the boxes 30 has a slit 31 into which the pulling-out jig D is to be inserted. When the pulling-out jig is inserted into the slit, a locking pin (not shown) penetrates through the above locking pin through-hole 29; as long as a cancel signal is not supplied, the pulling-out jig cannot be pulled out.

Each of the boxes 30 is provided with four (2×2 in length and breadth) display lamps L1, L2, L3 and L4. The lamps L1 and L3 at the upper stage are always lit in red and the lamps L2 and L4 are lit in blue when a specified signal is supplied. The locker G is so constructed that another pulling-out jig D can be taken out from the subsequent box 30 only when two lamps L2 and L4 are being lit in blue.

It is previously programmed that a large number of pulling-out jigs are used in order downwardly from above at right end of the figure as an arrow Q, and further sequentially used in the left column.

In the arrangement described above, when the fit-preventing body C is inserted into the hood 10 of the female connector B, the locking protrusion 24b of its locking arm 24 is engaged with the locking protrusion 12 of the locking chamber 11 and locked. When the female connector B is not used, the fit-preventing body C closes the hood 10 so that another connector is not inadvertently fit in the female connector B, and serves also as a dustproofing cover.

Now referring to the flowchart of FIG. 7 and FIGS. 8 to 10, an explanation will be given of the working process of coupling the male connector A and female connector B with each other which constitute an electric connector equipped with a false connection preventing mechanism according to the present invention. It is assumed that the male connector covered with a dustproofing cover (not shown) is used. It is also assumed that the fit-preventing body C is previously inserted in the hood 10 of the female connector B (FIG. 8) and locked.

First, the above dustproofing cover is removed from the male connector A on the side of a computer (not shown) on an instrument panel at a passenger's seat. This work is done manually by a worker on a line of manufacturing motor cars.

A checker (not shown) is fit in the male connector A to check the presence or absence of a false current. If the false current is not detected (OK), the (red) lamp L1 of the box 30 goes out and the (blue) lamp L2 thereof is lit. At the same time, the locking pin penetrating through the through-hole 29 comes out. Thus, the pulling-out jig D is first placed in a state where it can be taken out from the box 30.

On the other hand, if the false current is detected, the corresponding assembly line is automatically stopped to examine its cause and remove it.

Figure 9:
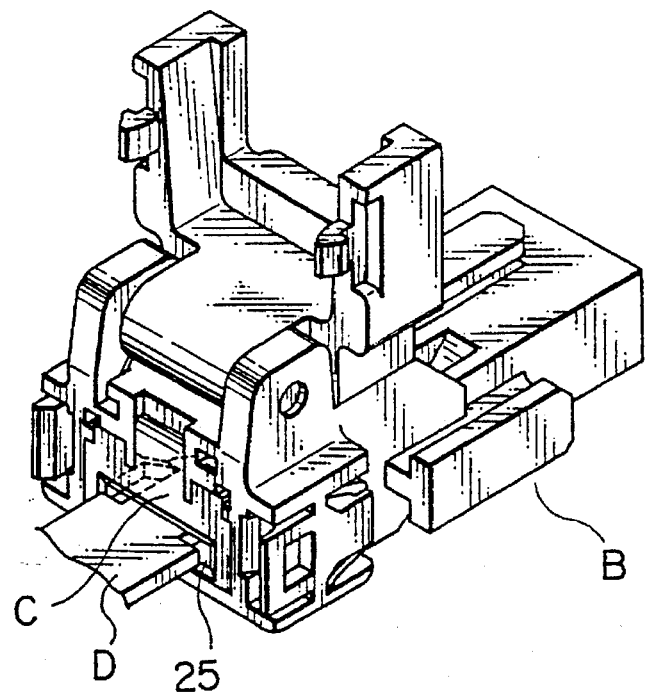
FIG. 9 is a view showing the step subsequent to the state shown in FIG. 8.
Figure 10:
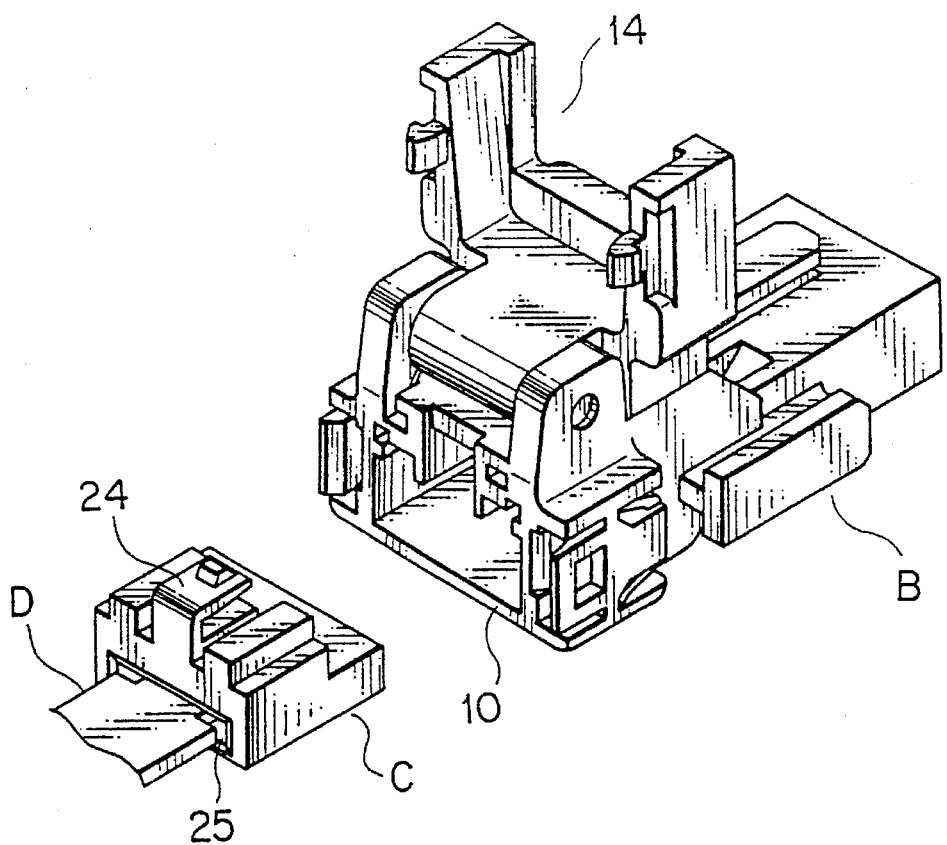
FIG. 10 is a view showing the steps subsequent to the state shown in FIG. 9.
Figure 11:
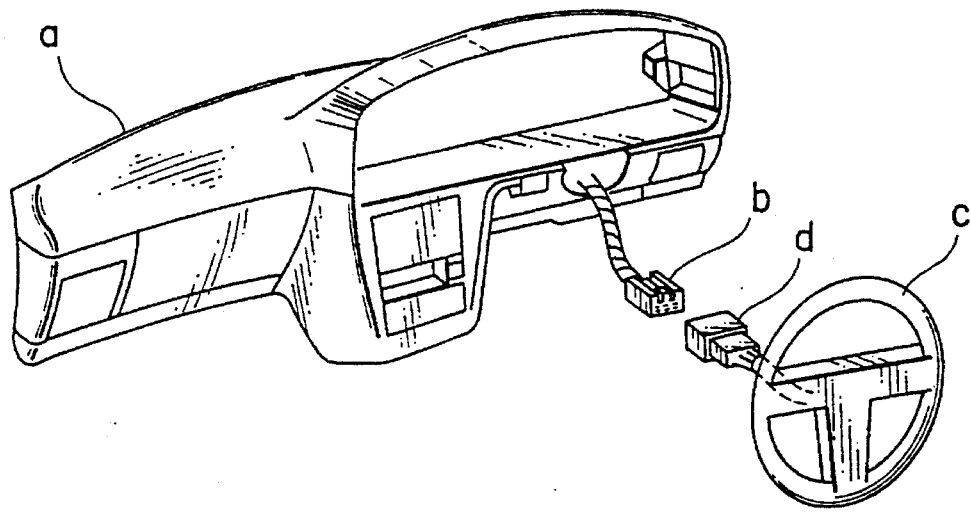
FIG. 11 is a pictorial view for explaining the connector according to the prior art.

If the checker fitting is OK, as shown in FIG. 9, the pulling-out jig D taken out from the box 30 is inserted into the insertion-locking portion 25 of the fit-preventing body C. Then, it is pulled to extract the fit-preventing body C from the hood 10 as shown in FIG. 10.

Specifically, when the pulling-out jig D is inserted into the insertion-locking portion 25, as shown in FIG. 3A, it is locked in such a manner that the locking pieces 28c, 28c at the head 28 are engaged with the slip-off preventing pieces 25c, 25c. In this state, when the pulling jig D is pulled, since the protrusion 24b of the locking arm 24 has both front and rear tapered ("semi-locking"), it may easily be unlocked from the locking protrusion 12.

After the male connector A is fit into the hood 10 of the female connector B, the locking member 14 is put down to the side of hood 10. Then, the coupling of both connectors is locked in such a manner that the locking pieces 18, 18 are engaged with the locking holes 19a, 19a of the flexible locking piece 19. Thus, the connection state of both connectors A and B is assured.

After the fitting of the male and female connectors is completed, the first pulling-out jig D used is returned to the box 30. Then, the pulling-out jig D is locked again, the (blue) lamp L4 is lit. In this case, if the pulling-out jig is not returned within a predetermined time after the first pulling-out jig is taken out from the box 30, the (red) lamp L3 is lit again.

When the (red) lamp L3 is lit, the assembly line is stopped again. This hinders the assembling process from advancing to the subsequent step and urges a worker to return the first pulling-out jig D to the box 30. As a result, lighting of two (blue) lamps L1 and L4 represents that the fitting and connection of the male and female connectors A and B has been completed.

Table 1 shows the relation between the connection procedure of the male and female connectors A and B and on/off state of the lamps L1 to L4.

|  | L1 | L2 | L3 | L4 |
|---|---|---|---|---|
| when the pulling jig is not used | red |  | red |  |
| checker fitting (OK) |  | blue | red |  |
| when a fit-preventing body is pulled out |  | blue | red |  |
| when the pulling-out jig is stored |  | blue |  | blue |
| when the pulling-out jig is not stored |  | blue | red |  |

A detailed explanation will be given of the fitting of the male connector A and female connector B in the above fitting procedure.

As shown in FIG. 4, the locking member 14 provided in the female connector B is in an upright state owing to the resilient force of the coil spring 20. Although it can be rotated in the direction shown by arrow P, where the male connector A is in an incomplete fitting state for the female connector, they cannot be locked. From this fact, the incomplete fitting of the male connector can be apparently decided.

As shown in FIG. 5, when the male connector is fit in the hood of the female connector B and the locking member 14 is closed, the cover plate 16 is located at the back face of the arm guard 5, and both connectors are doubly locked in such a manner that the locking protrusions 18, 18 are engaged with the locking holes 19a, 19a and the protrusion 4a of the locking arm 4 is engaged with the locking protrusion 12.

In this case, if the fitting of the male connector A is incomplete, the cover plate 16 abuts against the arm guard 5 so that the locking member 14 cannot be pulled down to lock the fitting. Thus, it is possible to prevent the occurrence of an incomplete fitting.

Incidentally, when the female connector B is not used, the locking member 14 is pulled down and locked so that its locking pieces 18, 18 are engaged with the holes 19a, 19a of the flexible locking piece 19. Thus, the female connector B can be held in a compact shape so that the space for storing it may be small. This makes it easy to store and transport the female connector B. Further, if the locking member 14 is in an upright state owing to the coil spring 20, when inserting the male terminal F equipped with a wire in the terminal housing chamber 8, the wire may be caught on the locking member 14. But, such inconvenience can be removed by the female connector B held in a compact shape described above.

Where the female connector B is used, if the flexible locking piece 19 is widened using the tip of a driver, the locking by the locking member 14 is canceled. So, as shown in FIG. 4, the locking member 14 is returned to the upright state by the function of the coil spring.

As described above, in accordance with the present invention, where a pair of electric connectors are fit in each other, it is possible to prevent false connections where the one connector element through which a false current is flowing is erroneously fit into and connected are with the other connector element and thus avoid an erroneous explosion in the inflator due to this false connection. Thus, the safety in the working process can be assured, and the reliability of the electrical connection of a pair of connector elements connected in coupling can be enhanced.

We claim:

1. A method of connecting a pair of connector parts to be coupled with each other, one connector element having a locking arm, the other connector element having a hood for receiving the one connector element and a locking projection provided within the hood, comprising the steps of:
   (a) inserting, into the hood, fit preventing means for preventing the one connector element being fit into the hood of the other connector element;
   (b) examining whether or not a false current is flowing through the other connector element;
   (c) in the step (b), if it is confirmed that the false current is not flowing therethrough, pulling out said fit-preventing means from the hood; and
   (d) fitting the one connector element into the other connector element whereby the pair of connector elements are locked in engagement by the locking arm with the locking protrusion when they are completely coupled with each other.

2. A method of connecting a pair of connector elements according to claim 1, wherein if it is confirmed in said step (b) that the false current flows, an assembly line is stopped to examine and remove the cause for the false current.

3. A method of connecting a pair of connector elements according to claim 2, wherein said step (c) is performed using a dedicated jig.

4. A method of connecting a pair of connector elements according to claim 1, wherein said step (c) comprises sub-steps of
   (c1) taking out a dedicated pulling-out jig from a predetermined position; and
   (c2) inserting said dedicated pulling-out jig into a portion of said fit-preventing means inserted in the hood of said other connector element to pull out said fit-preventing means.

5. A method of connecting a pair of connector elements, according to claim 4, further comprising the step of: after said step (d), returning said dedicated pulling-out jig to said predetermined position.

6. A method of connecting a pair of connector elements according to claim 5, wherein the operation using said dedicated pulling-out jig is controlled in a predetermined program.

7. A method of connecting a pair of electric connector elements to be coupled with each other using a false connection preventing mechanism, one connector element having a locking arm, the other connector element having a hood for receiving the one connector element and a locking protrusion provided within the hood, said locking protrusion to be engaged with said locking arm wherein means fit-preventing for preventing the one connector element from being fit in the other connector element is inserted in the hood, said means having a portion into which a dedicated pulling-out jig is to be inserted, and the pair of connector elements can be coupled with each other after said means is pulled out from the hood, comprising the steps of:
   (a) fitting a checker in said one connector element to check the presence or absence of a false current flowing through it;
   (b) if it is confirmed that the false current is not flowing therethrough, taking out said dedicated pulling-out jig from a predetermined position;
   (c) inserting said dedicated pulling-out jig into said portion of the fit-preventing means inserted in said other connector element to thereby pull out said fit-preventing means,
   (d) coupling both connector elements with each other and locking them to each other; and
   (e) returning said dedicated pulling-out jig to said predetermined position.

* * * * *